Sept. 6, 1938. A. ARUTUNOFF 2,129,256
METHOD OF MAKING INSULATING TUBES
Filed Nov. 4, 1937
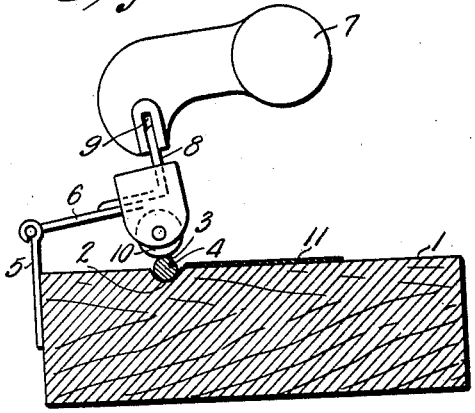
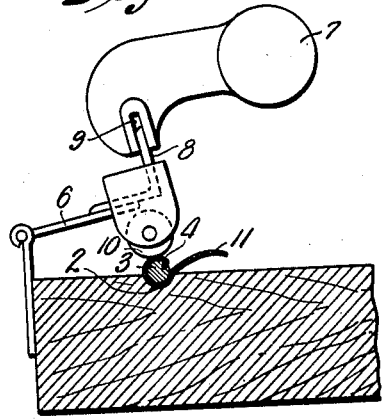
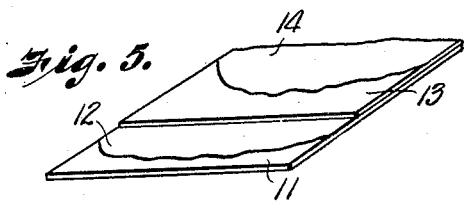
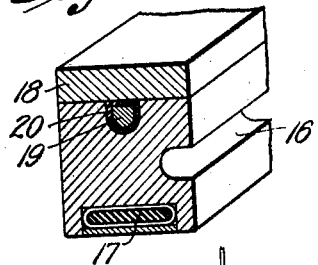
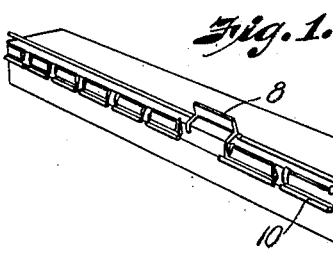
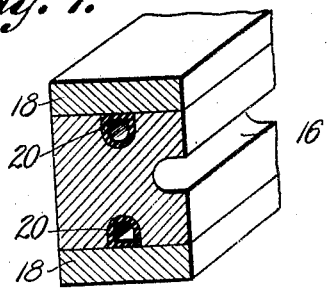
INVENTOR
Armais Arutunoff
BY Thos E. Hesfield
ATTORNEY Patented Sept. 6, 1938

2,129,256

UNITED STATES PATENT OFFICE 2,129,256

METHOD OF MAKING INSULATING TUBES

Armais Arutunoff, Bartlesville, Okla., assignor to Reda Pump Company, Bartlesville, Okla., a corporation of Delaware Application November 4, 1937, Serial No. 172,762

3 Claims. (Cl. 93—94)

My invention relates to a method of making insulating tubes for slot insulation of electrical motors.

This application is a continuation in part of my copending allowed application, Serial No. 73,693, filed April 10, 1936, for a "Method of making insulating tubes".

Certain types of electrical motors such as submergible electric motors for use in oil wells are of very great length and of small diameter. For example, a 75 horse power motor, designed with a rotor making 3600 revolutions per minute has a 5⅜ inch outer diameter and a length of active iron or stator of 16 feet. Similarly, a 100 horse power motor of the same outer diameter has a length of active iron of 21 feet. Slot insulation of such long stator must take the form of a long tube having a wall thickness of from .02 to .025 of an inch, and a cross section of approximately .25 square inch. Tubes of such length and dimensions are not obtainable in open market.

One object of my invention is to provide a method of making long insulating tubes.

Another object of my invention is to provide a method of making long insulating tubes of predetermined cross sectional shape.

Other and further objects of my invention will appear from the following description.

Insulating tubes for the slots of the stator of an electric motor of the length involved in the instant case are not round but are formed to fit the shape of the slots of the stator.

In the accompanying drawing which forms part of the instant specification and is to be read in conjunction therewith and in which like reference numerals are used to indicate like parts in the various views;

Figure 1 is a perspective view of a rolling bench adapted to be used in carrying out the process of my invention.

Figure 2 is a sectional end view of the bench of Figure 1 showing the position of parts when the rolling is about to take place.

Figure 3 is a view similar to that shown in Figure 2, showing the rolling operation commenced.

Figure 4 is a perspective view of a section showing a heating device for baking the tubes in the desired form.

Figure 5 is an enlarged view showing one method of assembling the material from which the insulating tubes may be made.

Figure 6 is a view showing the insulating tube being pulled off the form.

Figure 7 is a modification showing the molding operation conducted at ordinary temperatures.

The bench consists of a working surface 1 which may be made of wood, brass or any other suitable material, provided with a longitudinally extending groove 2 in which a rod 3 is adapted to be placed. The rolling rod 3 is provided at one end with a crank 21 by which it is adapted to be rotated. The rolling rod 3 is formed with a longitudinally extending slot 4. Secured to the working bench 1 are a plurality of brackets 5 to which are pivoted members 6 carrying angle members 8. Weights 7 are adapted to be positioned upon angle members 8 by means of any suitable connection, as for example slots 9. The angle members 8 support side pieces to which rollers 10 are pivoted. The arrangement is such that rollers 10 bear against rolling rod 3 to insure a tightly rolled tube. The working surface 1 may be of any suitable length and is long enough to take the longest insulating tube it is desired to fabricate. There are a number of pivoted members 6 so that these may be employed in the region in which the rolling of the insulating tubes is taking place.

In the manufacture of insulating tubes according to the method of my invention, a full length strip of insulating paper is placed upon the working bench and one edge thereof is engaged in the slot 4 of the rolling rod 3. The rod is then given at least one complete turn to start the rolling of the paper along its length. The insulating paper is then given a coat of shellac, lacquer, or other suitable material, and additional insulation such as a thin mica sheet or the like may be placed over the shellac. Additional lacquer, shellac, or the like is placed over the mica or other suitable insulating material and then the rod is loaded by moving pivoted members 6 to the position shown in Figures 2 and 3. The weights 7 which are supported by the members 6 exert a pressure upon rollers 10. The crank of the rod is then revolved, forming a tube which is round. The round tube is then removed. It is not necessary to permit the lacquer or shellac or the like to fully dry since there is a complete turn of insulating paper adjacent the rod which is not covered with adhesive. If desired, the tube may be permitted to dry for a short time.

When the rolling rod 3 is removed, a forming rod 19 is inserted through the cylindrical tube. This rod 19 is of the shape of the slot in which the insulating tube is to be used. The tube on the forming rod is then transferred into a baking device which is shown in Figure 4, according to one mode of proceeding. It is understood, of course, that, according to another mode of proceeding, it is not necessary to mold the tube at elevated temperature, as will be hereinafter more fully pointed out. It is to be understood that the baking device may be of any suitable construction. In the device shown in Figure 4, the baking device takes the form of a metal block of good heat conducting material such as copper or the like in which are formed recesses 16 which are shaped exactly as the slots in which the insulating tubes are to be used. A number of suitable forms of slots may be made in the baking device. The bottom of the metal block is provided with a recess in which is housed a heating element 17. These heating elements are well known to the art and form no part of my invention. The heat generated by the heating element is transmitted through the metal block. The forming rod with the tube thereon has been placed in a slot 16 and the cover plate 18 which is of sufficient weight to firmly close the slot is placed thereover. The tube is baked for a suitable interval of time to accomplish perfect adhesion of the various layers of lacquer or shellac. A temperature of from 200° to 350° F. will suffice for the baking. After baking, the forming rod is withdrawn from the end of the tube sufficiently to tie an end with wire as shown in Figure 6. The tube with the rod thereon is pushed into the slot of the stator. After insertion in the slot, the tube is held by the wire-wrapped end, while the forming rod is withdrawn. The surplus ends of the insulating tube are then cut off and the stator is ready for threading with wire.

Referring now to Figure 4, if time is not of the essence, the molding may take place under atmospheric temperature. In this case the tube is drawn while in a soft state, from the cylindrical forming mandrel into the mold and, while in the mold, is permitted to take the desired form. No core is used in this mode of proceeding, as it is desirable to have the interior of the tube open to the air to permit free circulation which will aid in the drying of the tube.

It will be observed that I have accomplished the objects of my invention. I have provided a method of producing insulating tubes of great length for slot insulation. I have provided a method of forming tubes of the desired cross sectional shape in a simple, convenient, and expeditious manner.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method for making insulating tubes including the steps of partially rolling a sheet of flexible material about a cylindrical form, applying insulating adhesive to an unrolled portion of said sheet, continuing the rolling of said sheet to form a tube, removing the cylindrical form from said tube while said adhesive is in a soft state, inserting a form having a predetermined cross-sectional shape into said tube, and molding said tube about said form at elevated temperature.

2. A method of making insulating tubes including the steps of partially rolling a sheet of flexible insulating material about a cylindrical form, applying adhesive to the unrolled portion of said sheet, continuing the rolling of said sheet to form a tube, removing the cylindrical form from said tube while said adhesive is in a soft state, inserting a form having a predetermined cross sectional shape into said tube, and molding said tube about said form at elevated temperatures.

3. A method of making insulating tubes for electric motors which insulating tubes are of great length with respect to their cross sectional area, including the steps of partially rolling a sheet of flexible insulating material about a cylindrical form, applying adhesive to the unrolled portion of said sheet, continuing the rolling of said sheet to form a tube, removing the cylindrical form from said tube while said adhesive is in a soft state, inserting said tube in a form having a predetermined cross sectional shape and molding said tube to said shape.

ARMAIS ARUTUNOFF.